United States Patent [19]

Sugitani et al.

[11] Patent Number: 4,883,326

[45] Date of Patent: Nov. 28, 1989

[54] VEHICLE BRAKING SYSTEM FOR DRIVE WHEELS, HAVING MEANS FOR DELAYING COMMENCEMENT OF BRAKE PRESSURE CHANGE

[75] Inventors: Tatsuo Sugitani, Mishima; Kiyoyuki Uchida, Susono; Hideo Inoue, Yamakita, all of Japan

[73] Assignee: Toyota Jidosha Kabushiki Kaisha, Japan

[21] Appl. No.: 163,784

[22] Filed: Mar. 3, 1988

[30] Foreign Application Priority Data

Mar. 11, 1987 [JP] Japan .................... 62-55583

[51] Int. Cl.⁴ .......................... B60T 8/58; B60T 8/64
[52] U.S. Cl. .................... 303/110; 303/100; 364/426.02
[58] Field of Search ............... 180/197; 188/181 A, 188/181 C; 303/91, 95, 96, 97, 100, 103, 105, 106, 109, 110; 364/426.02

[56] References Cited

U.S. PATENT DOCUMENTS

| | | | |
|---|---|---|---|
| 3,494,671 | 2/1970 | Slavin et al. | 303/106 |
| 3,697,139 | 10/1972 | Elliott et al. | 303/91 |
| 3,888,548 | 6/1975 | Sharp | 303/97 |
| 3,909,071 | 9/1975 | Klatt | 303/100 |
| 3,950,036 | 4/1976 | Fink et al. | 303/111 |
| 4,120,539 | 10/1978 | Carp et al. | 303/103 |
| 4,511,971 | 4/1985 | Dittner et al. | 303/110 X |
| 4,668,022 | 5/1987 | Sato | 303/96 X |
| 4,701,855 | 10/1988 | Fennel | 303/105 X |
| 4,824,184 | 4/1989 | Spadafora et al. | 303/100 |

FOREIGN PATENT DOCUMENTS 0966209 6/1971 Canada .
0213556 10/1985 Japan .

OTHER PUBLICATIONS

Laid-Open publication No. 58-15948 (Published in 1983) of Unexamined Japanese Patent Application No. 57-119196.
Manual for New "Toyota Soarer", 1/21/86, Toyota Jidosha Kabushiki Kaisha, pp. (4–91)–(4–100).

Primary Examiner—Andres Kashnikow
Assistant Examiner—Timothy Newholm
Attorney, Agent, or Firm—Oliff & Berridge

[57] ABSTRACT

A braking system including a hydraulically operated brake for braking a drive wheel of a motor vehicle, a slip detector for detecting an amount of slip of the drive wheel, and a pressure-regulating controller for increasing or decreasing a fluid pressure to be applied to the brake, in response to each output signal of the slip detector, whose value indicated a pressure-increase or pressure-decrease condition which requires an increase or decrease in the fluid pressure, respectively, such that the amount of slip of the drive wheel is maintained within an optimum range. The braking system incorporates a device for commanding the pressure-regulating controller to delay commencement to increase and/or decrease the fluid pressure to be applied to the brake, with respect to a part of the occurrences of the pressure-increase condition and/or the pressure-decrease condition, for a predetermined time duration as measured from a point of time at which the pressure-increase and/or said pressure-decrease condition is/are established.

8 Claims, 6 Drawing Sheets

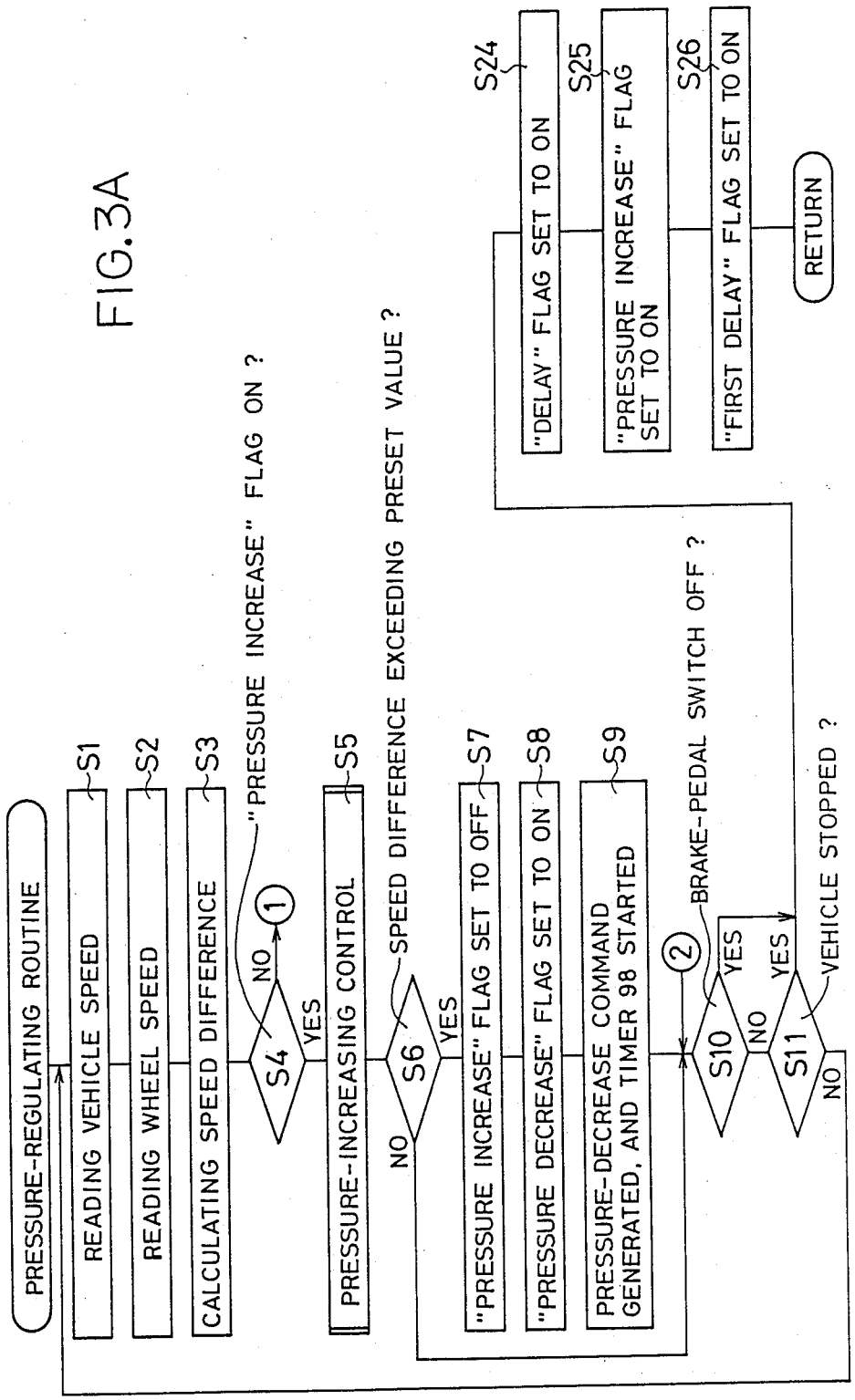

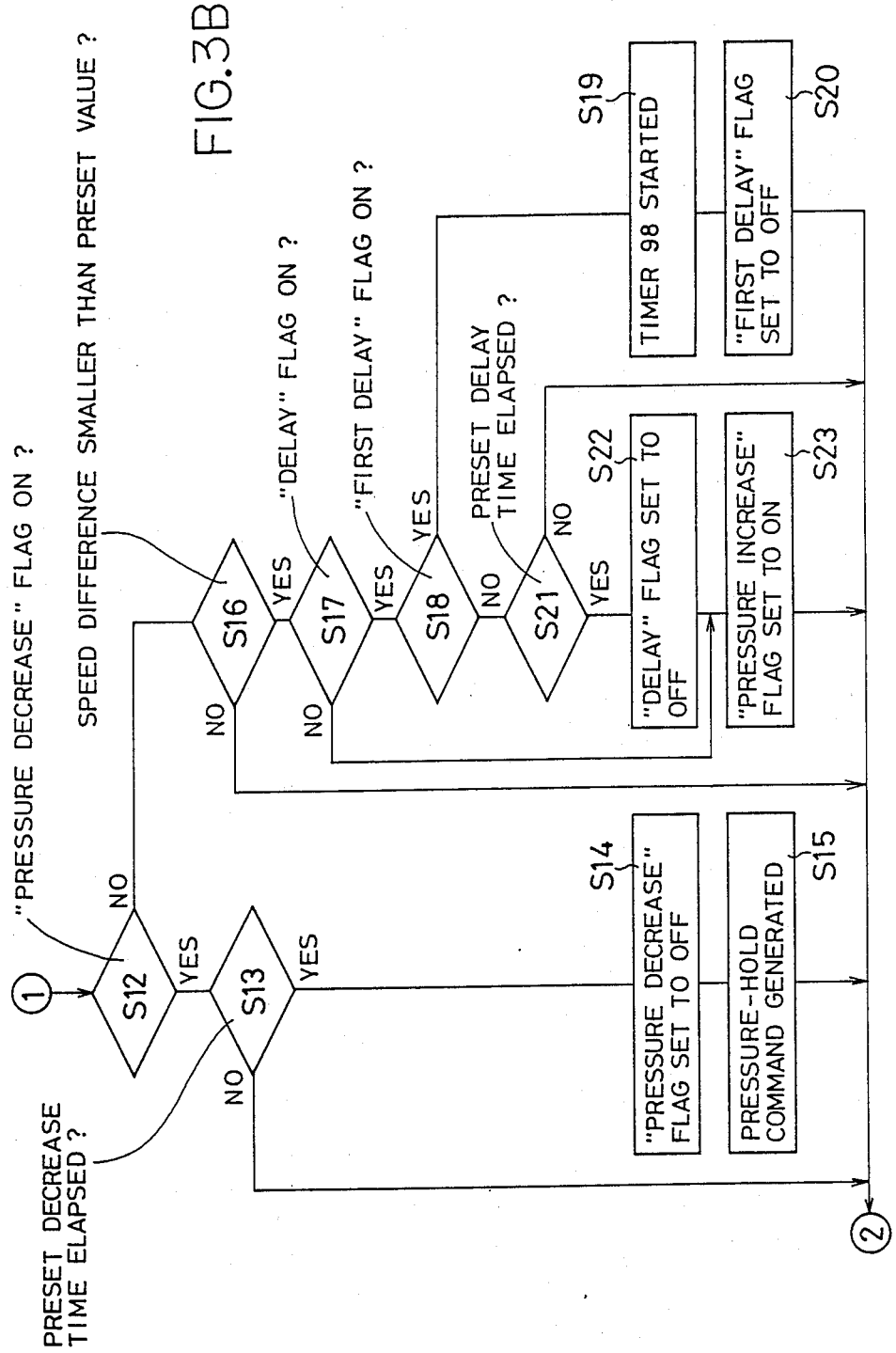

VEHICLE BRAKING SYSTEM FOR DRIVE WHEELS, HAVING MEANS FOR DELAYING COMMENCEMENT OF BRAKE PRESSURE CHANGE

BACKGROUND OF THE INVENTION

1. Field of the Invention

The present invention relates in general to a hydraulically operated braking system for braking a drive wheel or wheels of a motor vehicle, and more particularly to a control device for controlling the braking system, so as to maintain amounts of slip of the drive wheels within an optimum range, during brake application or acceleration of the vehicle.

b 2. Discussion of the Prior Art

When a brake is applied to a motor vehicle, the wheels of the vehicle will slip on the road surface if braking forces applied to the wheels exceed friction forces between the wheels and the road surface. The required braking distance of the vehicle increases with an increase in the amount of slip of the wheels. In light of this fact, there is proposed an anti-skid braking system wherein the fluid pressure to be applied to the wheel brake is automatically adjusted within an optimum range, as disclosed in the Manual for New "TOYOTA SOARER" (published on Jan. 21, 1986, by Toyota Jidosha Kabushiki Kaisha, the assignee of the present application).

The vehicle wheels will also slip on the road surface if drive forces transmitted to the drive wheels exceed the friction forces between the wheels and the road surface, upon rapid acceleration of the vehicle, for example, upon starting of the vehicle. In this case, the slip of the drive wheels results in lowering the acceleration rate of the vehicle or reducing the running stability. In view of this phenomenon, there is proposed a braking system incorporating a so-called "traction control" device which is adapted to automatically activate the brakes for preventing excessive amounts of slip of the drive wheels, by absorbing an excess of the drive force exerted on each drive wheel, as disclosed in Laid-Open Publication No. 58-16948 (published in 1983) of unexamined Japanese Patent Application No. 57-119196.

The proposed braking systems indicated above use a brake control arrangement which includes slip-detecting means for detecting the amount of slip of the wheels, and pressure-regulating control means for regulating the brake fluid pressures to be applied to the wheel brakes. The slip-detecting means produces output signals indicative of the detected amounts of slip of the wheels, and the pressure-regulating control means is operated in response to the output signals from the slip-detecting means, for increasing or decreasing the brake fluid pressures so as to maintain the amounts of slip of the drive wheels of the vehicle within a suitably selected range.

In the case where the anti-skid brake control or traction control is applied to the drive wheels, the pressure control system may suffer from cyclic control vibrations, due to a resonance of the drive system that drives the drive wheels, whereby the pressure-regulating control means fails to normally function to keep the amounts of slip of the drive wheels within the desired or optimum range. Stated more particularly, the engine, power transmission units, and drive wheels constitute a spring mass system which is likely to vibrate at the natural frequency. As a result, the rotating speeds of the drive wheels tend to change, without dependence upon the magnitude of the braking forces applied to the drive wheels, as compared with the reaction forces of the road surface. The pressure-regulating means is operated to control the brake fluid pressures for the drive wheels, based on the drive wheel speeds which change as described above. Accordingly, the brake pressure regulation cannot be adequately effected, leading to insufficient or excessive brake pressures applied to the drive wheels. In other words, the slip amounts deviate from the optimum range. In some instances, the brake pressure regulation by the pressure-regulating control means may even promote the resonance tendency of the drive system.

SUMMARY OF THE INVENTION

It is accordingly an object of the present invention to provide a braking system for a motor vehicle, which ameliorates the problem encountered in the prior art as described above.

The above object can be attained according to the principle of the present invention which provides a braking system including a hydraulically operated brake for braking a drive wheel of a motor vehicle, comprising: (a) slip-detecting means for detecting an amount of slip of the drive wheel and producing output signals indicative of the detected amounts of slip of the drive wheel; (b) pressure-regulating control means connected to the slip-detecting means, for increasing or decreasing a fluid pressure to be applied to the brake, in response to each output signal whose value indicates a pressure-increase or pressure-decrease condition which requires an increase or decrease in the fluid pressure to be applied to the brake, respectively, whereby the amount of slip of the drive wheel is maintained within an optimum range; and (c) delay means for commanding the pressure-regulating control means to delay commencement thereof to increase and/or decrease the fluid pressure to be applied to the brake, with respect to a part of occurrences of the pressure-increase condition and/or the pressure-decrease condition, for a predetermined time duration as measured from a point of time at which the pressure-increase and/or the pressure-decrease condition is/are established.

In the braking system of the present invention constructed as described above, the amount of slip of the drive wheel is maintained within the predetermined optimum range, by the pressure-regulating control means which is operated to change the fluid pressure to be applied to the corresponding brake. The term "amount of slip" is interpreted to mean either a difference between the vehicle speed and the wheel speed, or a slip ratio which is the above-indicated speed difference divided by the vehicle speed. During a brake pressure regulating operation of the pressure-regulating control means, the commencement of an increase and/or a decrease in the brake fluid pressure is delayed by the delay means, with respect to a part of occurrences of the pressure-increase condition or the pressure-decrease condition which requires a controlled change in the brake fluid pressure in order to maintain the optimum slip amount of the drive wheel. Described more specifically, the time delay indicated above is provided for the purpose of avoiding an otherwise existing tendency of resonance of the drive system of the vehicle, during an anti-skid braking operation or a traction control operation of the hydraulically operated brake for the drive wheel. However, the delay is not necessarily provided for each occurrence of the pressure-increase and pressure-decrease conditions. Namely, the delay may not be provided at all unless a predetermined condition is satisfied, even if the pressure-increase or pressure-decrease condition occurs. This aspect will be further discussed. Usually, the delay is provided for at least one of a plurality of occurrences of the pressure-increase condition and/or the pressure-decrease condition, which may exist within each operation of the pressure-regulating control means for an anti-skid braking action or a traction control action of the brake. The delay may be provided for either one or both of the pressure-increase and pressure-decrease conditions.

The time duration of the delay suitable for preventing the resonance tendency of the vehicle drive system during operation of the brake is determined based on the experiments of the individual types of the vehicle that are conducted during development of each vehicle, and therefore the optimum time duration varies depending upon the specific parameters of the individual vehicle types.

It follows from the above and the following descriptions that the present invention uses a relatively simple means, namely, the delay means, for effectively solving the conventionally experienced problem which may occur during operation of the hydraulically operated brake for the drive wheel.

According to one feature of the invention, the predetermined time duration is about a half of a period corresponding to a natural frequency of a drive system to drive the drive wheel. In this case, the resonance of the drive system to drive the drive wheel can be effectively avoided, in most of the various operating conditions of the braking system.

According to another feature of the invention, the delay means provides a delay for at least an increase in the fluid pressure to be applied to the brake. In this instance, the delay means may be adapted to provide a delay if a time interval between a last one of the occurrences of the pressure-increase condition and a current one of the occurrences is less than a preset value. The time interval less than the present value is often a symptom or a sign of a resonance of the drive system. If the time interval is longer than the preset value, no delay is provided since it is presumed that no resonance of the drive system exists.

According to an alternative feature of the invention, the above-indicated part of the occurrences of the pressure-increase and/or pressure-decrease conditions includes at least one predetermined occurrence which falls within a period of operation of the pressure-regulating control means corresponding to an operation of the brake. For example, the delay is provided only once within the above period of operation, for instance, when the pressure-increase condition occurs for the first time after a first occurrence of the pressure-decrease condition. Even in this case, the otherwise possible resonance of the drive system can be substantially prevented in most of the operating conditions.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which:

FIGS. 3A and 3B are a flow chart representing a part of control programs stored in a program memory, for effecting a pressure-regulating routine according to one preferred embodiment of the invention;

DETAILED DESCRIPTION OF THE PREFERRED EMBODIMENTS

Referring first to FIGS. 1, 2, 3A and 3B, there is shown one embodiment of the braking system of the present invention in the form of an anti-skid braking system for drive wheels of a motor vehicle.

Figure 1:
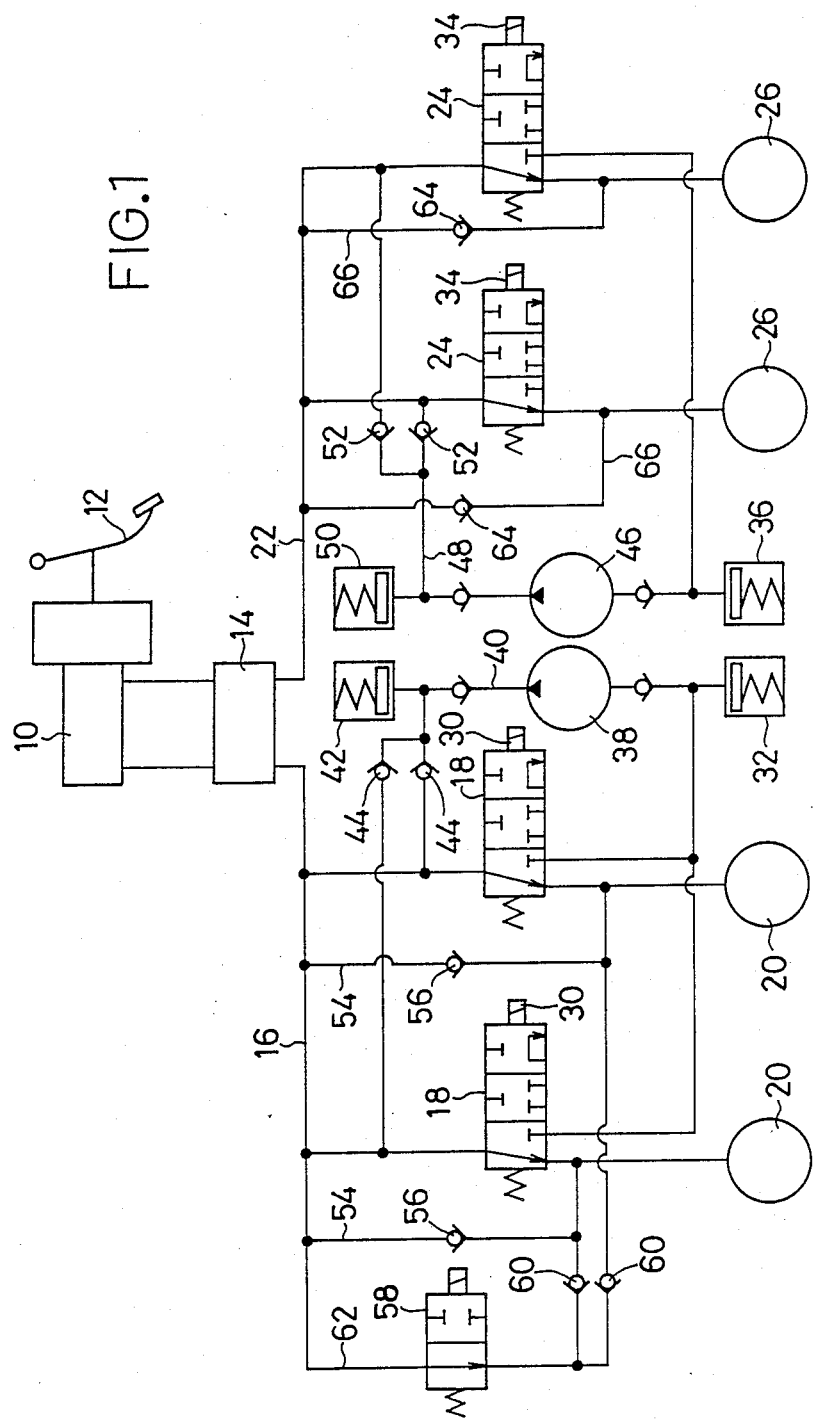
FIG. 1 is a circuit diagram of a hydraulically operated brake arrangement for a motor vehicle, including one form of a braking system of the present invention for drive wheels of the vehicle.

In FIG. 1, reference numeral 10 designates a master cylinder which has two mutually independent pressurizing chambers. The master cylinder 10 is adapted to produce fluid pressures which are proportional to an operating force acting on a brake pedal 12 of the vehicle. The pressurized fluid pressure developed by one of the two chambers of the master cylinder 10 is fed to a primary fluid passage 16 via a proportioning/by-pass valve 14. The fluid passage 16 is split into two branch lines which are connected to respective front wheel cylinders 20, 20 via respective solenoid-operated, three-position directional control valves 18, 18. The pressurized fluid pressure developed by the other chamber of the master cylinder 10 is fed to another primary fluid passage 22 via another proportioning/by-pass valve 14. This fluid passage 22 is also split into two branch lines connected to respective rear wheel cylinders 26, 26 via respective solenoid-operated, three-position directional control valves 24, 24. Thus, the instant braking system has two independent piping systems for the front and rear wheel brakes.

While the front piping system including the primary fluid passage 16 is normal or intact, the proportioning/by-pass valve 14 functions to proportionally reduce the received master cylinder pressure and deliver he reduced pressure to the rear piping system including the primary fluid passage 22. While the front piping system is not normally functioning or defective, the proportioning/by-pass valve 14 operates to transmit the master cylinder pressure to the rear wheel cylinders 26, 26, without the proportional pressure reduction.

The front wheel cylinders 20, 20 are incorporated in front wheel brakes used for braking front wheels of the vehicle, which are freely driven wheels, while the rear wheel cylinders 26, 26 are incorporated in rear wheel brakes used for braking rear wheels, which are drive wheels positively driven to drive the vehicle.

The three-position directional control valves 18 are normally placed in a pressure-increase position in which the front wheel cylinders 20 communicate with the master cylinder 10 through the valves 18. When a solenoid 30 of each valve 18 is energized by a comparatively large amount of electric current, the valve 18 is switched to a pressure-decrease position in which the corresponding front wheel cylinder 20 is disconnected from the master cylinder 10, but communicate with a reservoir 32 through the valve 18. When the solenoid 30 is energized by a comparatively small amount of current, the valve 18 is placed in a pressure-hold position in which the front wheel cylinder 20 is disconnected from both the master cylinder 10 and the reservoir 32. Similarly, the three-position directional control valves 24 are operated, according to an amount of electric current applied to its solenoid 34, so that the valves 24 are selectively placed in its pressure-increase position for communication between the rear wheel cylinders 26 and the master cylinder 10, pressure-decrease position for communication between the rear wheel cylinders 26 and a reservoir 36, and pressure-hold position for disconnection of the cylinders 26 from the master cylinder 10 and the reservoir 36.

The brake fluid in the reservoir 32 is pumped by a pump 38, and is returned to the primary fluid passage 16 through a pump passage 40. The pump passage 40 incorporates a damper 42 for attenuating a discharge pulsation of the pressurized fluid delivered by the pump 38. The pump passage 40 further incorporates two check valves 44 for preventing a flow of the fluid in a direction from the primary fluid passage 16 into the damper 42.

The rear piping system has a pump 46, a pump passage 48, a damper 50, and two check valves 52, which are identical with those used in the front piping system.

The front piping system is also provided with two recirculating passages 54 which permit return flows of the pressurized fluid from the front wheel cylinders 20 back into the master cylinder 10, while by-passing the respective directional control valves 18. Each recirculating passage 54 incorporates a check valve 56 for preventing a flow of the fluid toward the front wheel cylinders 20. The front piping system is further provided with a by-pass passage 62 in which are incorporated a normally open shut-off valve 58, and two check valves 60. When the pressure developed by the master cylinder 10 is applied to the front wheel cylinders 20, the pressurized fluid is supplied to the cylinders 20 through the by-pass passage 62, as well as through the primary fluid passage 16, so that the cylinders 20 are activated with a sufficiently high rate of flow of the pressurized fluid.

The rear piping system is provided with two recirculating passages 66 equipped with a check valve 64 respectively, but is not provided with a by-pass passage.

Figure 2:
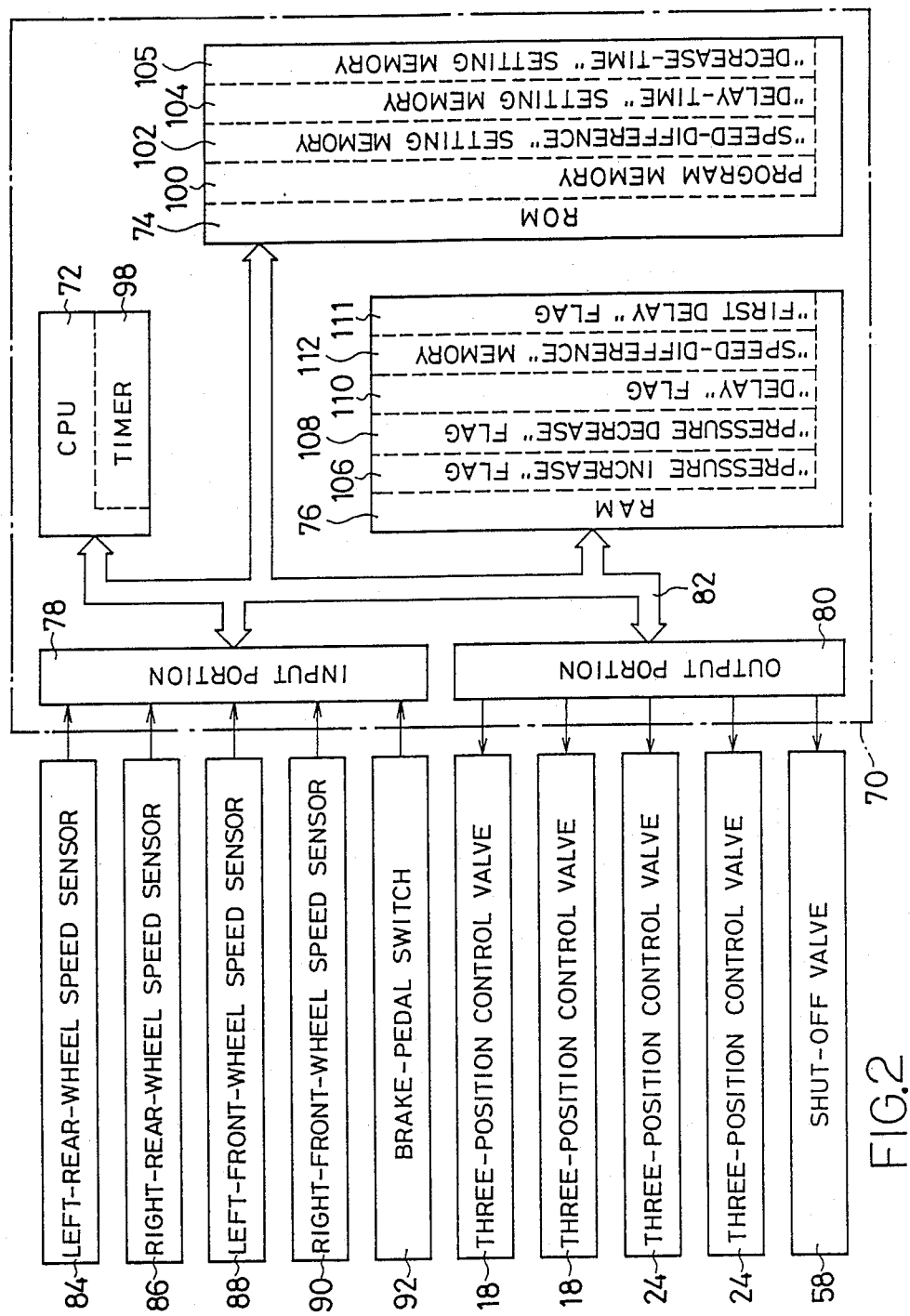
FIG. 2 is a block diagram showing an electric control system for the brake arrangement of FIG. 1.

Referring to FIG. 2, there is shown an electric control system for controlling the solenoid-operated, three-position directional control valves 18, 24, and the shut-off valve 58. The control system is principally constituted by an electronic skid control computer (hereinafter referred to as "ESC computer") 70. This ESC computer 70 includes a CPU (central processing unit )72, a ROM (random access memory) 74, a RAM (read-only memory) 76, an input portion 78, an output portion 80, and a bus 82 for interactive communication within the computer. To the input portion 78, there are connected speed sensors 84, 86, 88 and 90 for detecting the speeds of the four wheels of the vehicle, and a brake-pedal switch 92 for detecting a depression of the brake pedal 12. To the output portion 80 of the control system are connected to the above-described three-position control valves 18, 24 and the shut-off valve 58.

Figure 4:
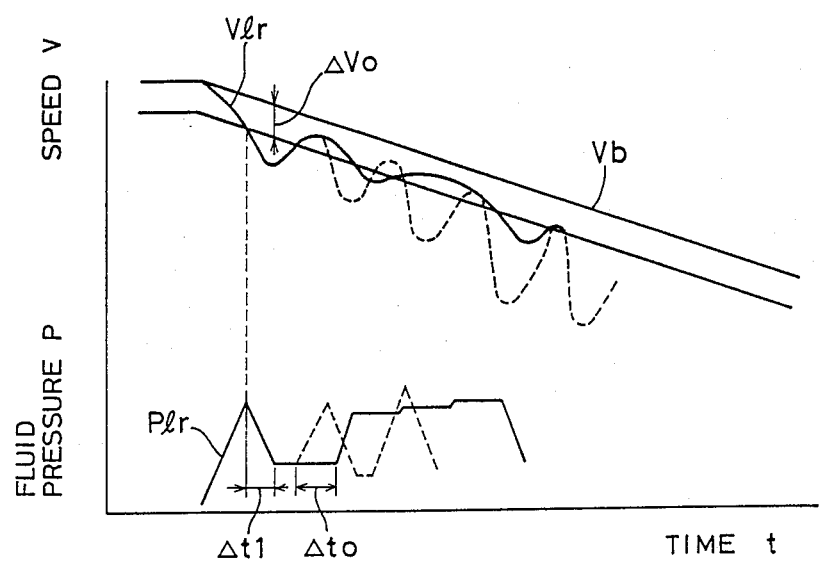
FIG. 4 is an illustration showing a pressure regulating operation according to the pressure-regulating routine of FIGS. 3A and 3B.

The CPU 72 incorporates a timer 98 whose function will be described. The ROM 74 includes a program memory 100 which stores various control programs such as a pressure-regulating routine that is represented by the flow chart of FIGS. 3A and 3B. The ROM 74 includes a SPEED-DIFFERENCE setting memory 102, a DELAY-TIME setting memory 104, and a DECREASE-TIME setting memory 105. The SPEED-DIFFERENCE setting memory 102 stores a predetermined value $\Delta Vo$ of a difference $\Delta V$ between a vehicle speed Vb and a speed Vlr, Vrr, Vlf, Vrf of the left-rear, right-rear, left-front and right-front wheels of the vehicle, as indicated in FIG. 4. In this figure, only the speed Vlr of the left-rear wheel is indicated by way of an example. The DELAY-TIME setting memory 104 and the DECREASE-TIME setting memory 105 store a predetermined value $\Delta$ to of a delay time (time duration which will be described), and a predetermined value $\Delta$ t1 of a pressure-reducing time, both being indicated in FIG. 4. The predetermined value $\Delta$to of the delay time is determined to be equal to a half ($\frac{1}{2}$) of a period corresponding to a resonance frequency of the drive system which includes the power transmission system to drive the rear drive wheels. The RAM 76 includes a PRESSURE INCREASE flag 106, a PRESSURE DECREASE flag 108, a DELAY flag 110, a FIRST DELAY flag 111 and a SPEED-DIFFERENCE memory 112. The functions of these flags and a memory will be described.

The CPU 72 operates to control the control valves 18, 24 and the shut-off valve 58, according to the control programs stored in the program memory 100. The control programs will be described, to an extent necessary for the understanding of the present invention.

Upon power application to the ESC computer 70, a main program (not shown) is executed. The main program includes an initialization step in which the various registers, flags and memories including those described above are reset or set, or cleared to their initial states. In this initialization step, the PRESSURE INCREASE flag 106, DELAY flag 110 and FIRST DELAY flag 111 are set to the ON states, while the PRESSURE DECREASE flag 108 is set to the OFF state. The SPEED-DIFFERENCE memory 112 is cleared.

When the brake pedal 12 is depressed, a high-level signal is produced by the brake-pedal switch 92, and the CPU 72 determines whether the speed difference $\Delta V$ between the detected vehicle speed Vb and the detected speed Vlr, etc. of the wheels exceeds the preset or predetermined value $\Delta Vo$, or not. This determination is repeatedly accomplished. Described more specifically, the highest one of the speeds of the four wheels detected by the respective speed sensors 84, 86, 88, 90 is presumed to represent the vehicle speed Vb. This presumed vehicle speed Vb is compared with the detected speed of each wheel, to obtain a speed difference $\Delta V$. Then, a determination is made as to whether the calculated speed difference $\Delta V$ exceeds the predetermined speed-difference value $\Delta Vo$ stored in the SPEED-DIFFERENCE memory 102. Unless the difference $\Delta V$ exceeds the predetermined value $\Delta Vo$, the CPU 72 determines that an anti-skid control of the brake fluid pressures to be applied to the respective wheel cylinders 20, 26 is not necessary, whereby the three-position control valves 18, 24 are held in their pressure-increase positions, and the shut-off valve 58 is held open.

If the difference $\Delta V$ between the presumed vehicle speed Vb and the speed of any one of the wheels exceeds the predetermined value $\Delta Vo$, the CPU 72 determines that it is necessary to effect an anti-skid control of the brake fluid pressure for that specific wheel. To this end, a pressure-regulating routine shown in FIGS. 3A and 3B will be executed.

Assuming that the anti-skid control operation is effected with respect to the left-rear drive wheel, the operation is achieved in the following manner. Referring to the lower part of the illustration in FIG. 4, the anti-skid control is effected such that the fluid pressure Plr in the rear wheel cylinder 26 for the left-rear drive wheel is started to be lowered, at the moment when the speed difference $\Delta V$ between the vehicle speed Vb and the speed Vlr of the left-rear wheel has exceeded the predetermined value $\Delta Vo$ during a gradual drop of the speed Vlr of the left-rear wheel due to an increase of the pressure Plr applied to the corresponding wheel cylinder 26. The decrease in the pressure Plr continues for the predetermined time length $\Delta t1$, and then the decreased pressure Plr is maintained. As a result, the speed Vlr starts to rise again, and the speed difference $\Delta V$ decreases to the predetermined value $\Delta Vo$. At this point of time, an increase in the fluid pressure Plr is commenced as indicated in broken line in FIG. 4, according to the conventional arrangement. In the instant embodiment of the invention, however, the increase in the pressure Plr commences only after the predetermined time duration (delay time) $\Delta to$ has elapsed. This time delay is provided only at this occurrence of a pressure-increase condition which follows the first occurrence of a pressure-decrease condition. Namely, the time delay $\Delta to$ is provided when the increase in the fluid pressure Plr is required for the first time after the fluid pressure Plr is lowered for the first pressure during the period of an anti-skid pressure regulating operation initiated by the operation of the brake pedal 12. At the subsequent occurrences of the pressure-increase condition, therefore, the increasing action of the pressure Plr is commenced as soon as the difference $\Delta V$ between the left-rear wheel speed Vlr and the vehicle speed Vb has been reduced to the predetermined value $\Delta Vo$.

The above pressure-regulating routine will be described in greater detail, by reference to FIGS. 3A and 3B, wherein step S1 is initially executed to read in the vehicle speed Vb. Step S1 is followed by step S2 in which the speed Vlr of the left-rear wheel (hereinafter called "wheel speed Vlr") is read in. In step S3, the speed difference $\Delta V$ between the two speeds Vb and Vlr is calculated, and stored in the SPEED-DIFFERENCE memory 112.

In the following step S4, the CPU 72 determines whether the PRESSURE INCREASE flag 106 is set at ON. Since this flag 106 is set at ON, an affirmative decision (YES) is obtained in step S4, which is then followed by step S5 for increasing the fluid pressure Plr. The pressure increasing operation in step S5 is usually performed in one of a RAPID INCREASE mode and a SLOW INCREASE mode. In the RAPID INCREASE mode, the three-position control valve 24 is held in its pressure-increase position, for effecting a rapid increase in the pressure Plr in the rear wheel cylinder 26. In the SLOW INCREASE mode, the control valve 24 is alternately placed in its pressure-increase position and pressure-hold position, so that the pressure Plr is slowly increased. Since this manner of increasing the fluid pressure is well known in the art, no further explanation of the same is deemed necessary for the understanding of the present invention.

In the next step S6, a determination is made as to whether the speed difference $\Delta V$ exceeds the predetermined value $\Delta Vo$. The determination is accomplished by comparing the speed difference $\Delta V$ stored in the SPEED-DIFFERENCE memory 112 in step S3, with the predetermined speed-difference value $\Delta Vo$ stored in the SPEED-DIFFERENCE setting memory 102. Since the present pressure-regulating routine is initiated because of the speed difference $\Delta V$ exceeding the predetermined value $\Delta Vo$, as described above, it will be apparent that an affirmative decision (YES) is obtained in step S6. Then, the control flow goes to step S7 in which the PRESSURE INCREASE flag 106 is set to OFF, and to step S8 in which the PRESSURE DECREASE flag 108 is set to ON. Subsequently, the CPU 72 executes step S9 in which the CPU 72 generates a pressure decrease command to place the three-position control valve 24 in its pressure-decrease position. Thus, the control valve 24 is switched to its pressure-decrease position immediately after the commencement of the pressure-regulating routine. As a result, the fluid pressure Plr in the rear wheel cylinder 26 which has been increased begins to be lowered. At the same time in step S9, the timer 98 is reset and started, in order to measure the time length $\Delta t1$ during which the pressure decrease continues.

Successively, the control flow goes to step S10 to determine whether the brake-pedal switch 92 is OFF, i.e., whether the brake pedal 12 is released, or not. In step S11, a determination is made as to whether the vehicle is brought to a stop (more precisely, whether the vehicle speed is lowered down to a very low speed). Since the brake pedal 12 is kept depressed and the vehicle is still running at a relatively high speed, at this point of time in the instant example, a negative decision (NO) is obtained in each of these steps S10, S11. Consequently, the control flow goes back to step S1.

The speed difference $\Delta V$ is again calculated in steps S1–S3, and the determination of step S4 is made. Since the PRESSURE INCREASE flag 106 has been set to OFF in step S7, a negative decision is obtained in step S4, and the control flow goes to step S12 (FIG. 3B) in which a determination is made as to whether the PRESSURE-DECREASE flag 108 is set at ON, or not. Since the flag 108 has been set to ON in step S8, an affirmative decision is obtained in step S12, and step S13 is then executed to determine whether the time measured by the timer 98 which was started in step S9 exceeds the predetermined pressure-reducing time $\Delta t1$ stored in the DECREASE-TIME setting memory 105, or not. At this point of time, the measured time after the generation of the pressure decrease command is less than the predetermined time $\Delta t1$, a negative decision is obtained in step S13. Consequently, the control flow skips steps S14 and S15, and goes to step S10.

The above steps are repeated until the decision in step S13 becomes affirmative (YES). When the time measured by the timer 98 exceeds the predetermined pressure-reducing time $\Delta t1$, step S14 is executed to set the PRESSURE DECREASE flag 108 to OFF, and step S15 is implemented to generate a pressure hold command, which causes the three-position control valve 24 to be placed in the pressure-hold position. Thus, the anti-skid control of the fluid pressure in the instant braking system is effected such that a decrease in the fluid pressure at each occurrence of the pressure-decrease condition (which requires the fluid pressure to be decreased) continues for the predetermined time length $\Delta t1$. Each pressure decrease action is followed by a pressure-hold action as indicated in the lower part of FIG. 4. As a result of the pressure decrease and hold actions, the speed difference ΔV between Vb and Vlr which has been increasing then starts decreasing, with the wheel speed Vlr commencing to rise, as indicated in the upper part of FIG. 4.

In step S12 which is executed following steps S1–S4 after the PRESSURE DECREASE flag 108 was set to OFF in step S14, a negative decision (NO) is obtained, and therefore the control flow goes to step S16. In this step S16, a determination is made as to whether the speed difference ΔV between the wheel speed Vlr and the vehicle speed Vb is reduced to the predetermined value ΔVo. Immediately after the control valve 24 is switched to its pressure-hold position, a negative decision is usually obtained in S16, and the control flow goes to steps S10, S11, skipping steps S17 through S23. Therefore, the control flow goes back to step S1. While the above steps are repeated, the speed difference ΔV becomes smaller than the predetermined value ΔVo due to the increasing wheel speed Vlr, whereby an affirmative decision is obtained in step S16. Step S16 is followed by step S17 to determine whether the DELAY flag 110 is set at ON. Since the DELAY flag 110 was set to ON in the initialization step of the main program as described before, an affirmative decision is obtained in step S17 when this step S17 is executed for the first time after the operation of the brake pedal 12. As a consequence, step S18 is executed to determine whether the FIRST DELAY flag 111 is set at ON, or not. Since the FIRST DELAY flag 111 was also set to ON in the initialization step, an affirmative decision is obtained in step S18, which is then followed by step S19 to start the timer 98, and step S20 to set the FIRST DELAY flag 111 to OFF. The control flow then goes back to step S1.

In the next execution of step S18, therefore, a negative decision is obtained, and step S21 is implemented to determine whether the time measured by the timer 98 started in step S19 exceeds the predetermined time duration (delay time) Δto stored in the DELAY-TIME setting memory 104. Since a negative decision is obtained in step S21 in an early period after the start of the timer 98, the control flow goes back to step S1, skipping step S22 and S23. As the appropriate steps are repeated, the time measured by the timer 98 reaches the predetermined delay time Δto, whereby an affirmative decision is obtained in step S21. Therefore, the control flow goes to step S22 to set the DELAY flag 110 to OFF, and to step S23 to set the PRESSURE INCREASE flag 106 to ON.

Accordingly, an affirmative decision is obtained in the next execution of step S4, whereby the pressure increase operation in step S5 is again performed.

This second occurrence of the pressure-increase condition is followed by a second occurrence of the pressure-decrease condition, and a second pressure-hold condition, in the same manner as described above. However, the instant second pressure-hold condition is not followed by a time delay to delay the commencement of a third pressure increase. Described more specifically, when an affirmative decision is obtained in step S16 after the second pressure-hold condition, step S17 is executed. Since the DELAY flag 110 was set to OFF in step S22, a negative decision is obtained in step S17. Therefore, the control flow goes to step S23, skipping steps S18, S21 and S22. Thus, a delay is not provided with respect to the third occurrence of the pressure-increase condition which following the second occurrences of the pressure-decrease condition and the pressure-hold condition.

When the brake pedal 12 is released during the anti-skid brake control operation, or when the vehicle speed Vb is lowered to the predetermined extremely low level that indicates a stop of the vehicle, an affirmative decision is obtained in step S10 or S11, whereby the control flow goes to steps S24, S25 and S26 to turn ON the DELAY flag 110, PRESSURE INCREASE flag 106 and FIRST DELAY flag 111. Thus, the anti-skid brake pressure control operation initiated by an operation of the brake pedal 12 is completed.

While the foregoing detailed description refers to the left-rear drive wheel, the same description applies to the right-rear drive wheel. Although a similar brake pressure control operation is effected with respect to the front wheels, the above-discussed delay for the commencement of the second pressure increase is not provided.

In the instant braking system which has been described in detail, an otherwise possible vibration of the fluid control operation can be avoided by providing a delay for the predetermined time duration Δto, with respect to the second occurrence of the pressure-increase condition which follows the first occurrences of the pressure-increase and -hold conditions. Stated in detail, the conventional arrangement is adapted such that the second pressure increase in the fluid pressure Plr in the rear wheel cylinder 26 is commenced as soon as the speed difference ΔV between the wheel speed Vlr and the vehicle speed Vb has been reduced to the predetermined value ΔVo, as indicated in broken line in the lower part of FIG. 4. In this arrangement, however, the speed Vlr of the left-rear drive wheel periodically fluctuates due to resonance of the drive system to drive the drive wheel, as indicated in broken line in the upper part of the same figure. Therefore, the ESC computer 70, if operated according to the conventional arrangement, controls the fluid pressure Plr by periodically increasing and decreasing the pressure Plr in response to the periodic change in the wheel speed Vlr, as indicated in broken line in FIG. 4. Since the periodic increase and decrease of the fluid pressure Plr are effected, irrespective of the magnitudes of the braking force applied to the left-rear wheel and the reaction force of the road surface, the fluid pressure Plr in the rear wheel cylinder 26 cannot be adequately regulated, with a result of a skidding or locking of the left-rear wheel, or an unreasonably restricted braking force applied to that drive wheel. On the contrary, the instant braking system constructed according to the principle of the invention is adapted to provide a delay for the predetermined time duration, before the second pressure increase following the first pressure-decrease and -hold conditions is commenced. This time delay makes it possible to avoid the otherwise existing periodic fluctuation of the drive wheel. That is, the speed Vlr of the left-rear drive wheel can be reduced substantially following the decreasing vehicle speed Vb, as indicated in solid line in the upper part of FIG. 4. Thus, the slip ratio of the rear drive wheel in question can be maintained within the optimum range.

It follows from the foregoing description of the instant embodiment: that slip-detecting means for detecting amounts of slip of the vehicle wheels is constituted by the speed sensors 84, 86, 88, 90, SPEED-DIFFERENCE setting memory 102 of the ROM 74, CPU 72, SPEED-DIFFERENCE memory 112 of the RAM 76, and a portion of the program memory 100 of the ROM 74 which stores the program to execute steps S1 through S3 in the flow chart of FIG. 3A; that pressure-regulating control means for regulating the fluid pressures in the wheel cylinders 20, 26 is constituted by the DECREASE-TIME setting memory 105, PRESSURE INCREASE and PRESSURE DECREASE flags 106, 108 of the RAM 76, output portion 80, three-position control valves 18, 24, and a portion of the program memory 100 of the ROM 74 which stores the program to execute steps S4–S25 except for S17–S22 and S24 of the flow chart of FIGS. 3A, 3B; and that delay means for commanding the pressure-regulating control means to delay its commencement to increase the fluid pressure is constituted by the DELAY-TIME setting memory 104 of the ROM 74, timer 98, CPU 72, DELAY and FIRST DELAY flags 110, 111 of the RAM 76, and a portion of the program memory 100 of the ROM 74 which stores the program to execute steps S17–S22, S24, and S26.

Although the present illustrated embodiment is adapted such that the delay of the commencement to increase the fluid pressure is provided only once at the second occurrence of the pressure-increase condition during a period of brake pressure control operation initiated by a single depression of the brake pedal 12, it is possible to provide a delay for a plurality of occurrences of the pressure-increase condition and/or the pressure-decrease condition, for example, for each occurrence of the pressure-increase condition, during each brake pressure control operation, so that the control vibration or periodic fluctuation of the wheel speeds can be more effectively avoided.

While the illustrated embodiment detects the amounts of slip of the vehicle wheels as a difference between the vehicle speed and the wheel speed, the slip can be detected as a slip ratio which is obtained by dividing the difference by the vehicle speed.

In the illustrated embodiment, the timing to provide a delay is predetermined within the period of each brake pressure control operation, i.e., at the second occurrence of the pressure-increase condition. However, it is possible to detect the control vibration by monitoring a time interval between two successive occurrences of the pressure-increase condition which requires the fluid pressure to be increased. More specifically, the time interval between the two successive occurrences of the pressure-increase condition is measured by suitable means such as the timer 98, and the measured time interval is compared with a predetermined length. If the measured time interval is shorter than the predetermined length, it indicates that the brake fluid control suffers from the control vibration as indicated in broken line in the upper part of FIG. 4. In this instance, a suitable length of delay is provided.

Figure 5:
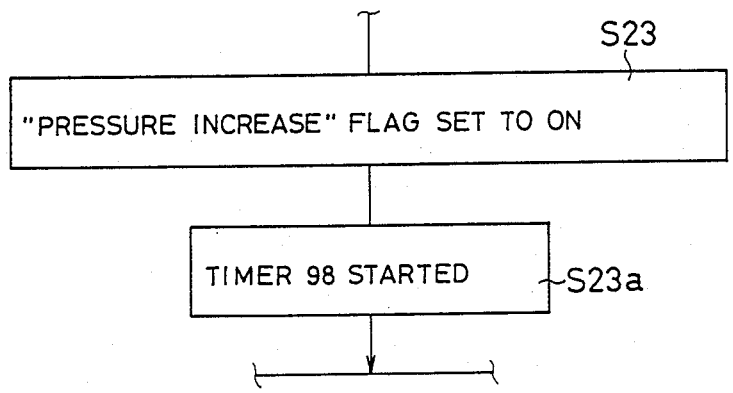
FIGS. 5 and 6 are a part of a pressure-regulating routine according to a modified embodiment of the invention.
Figure 6:
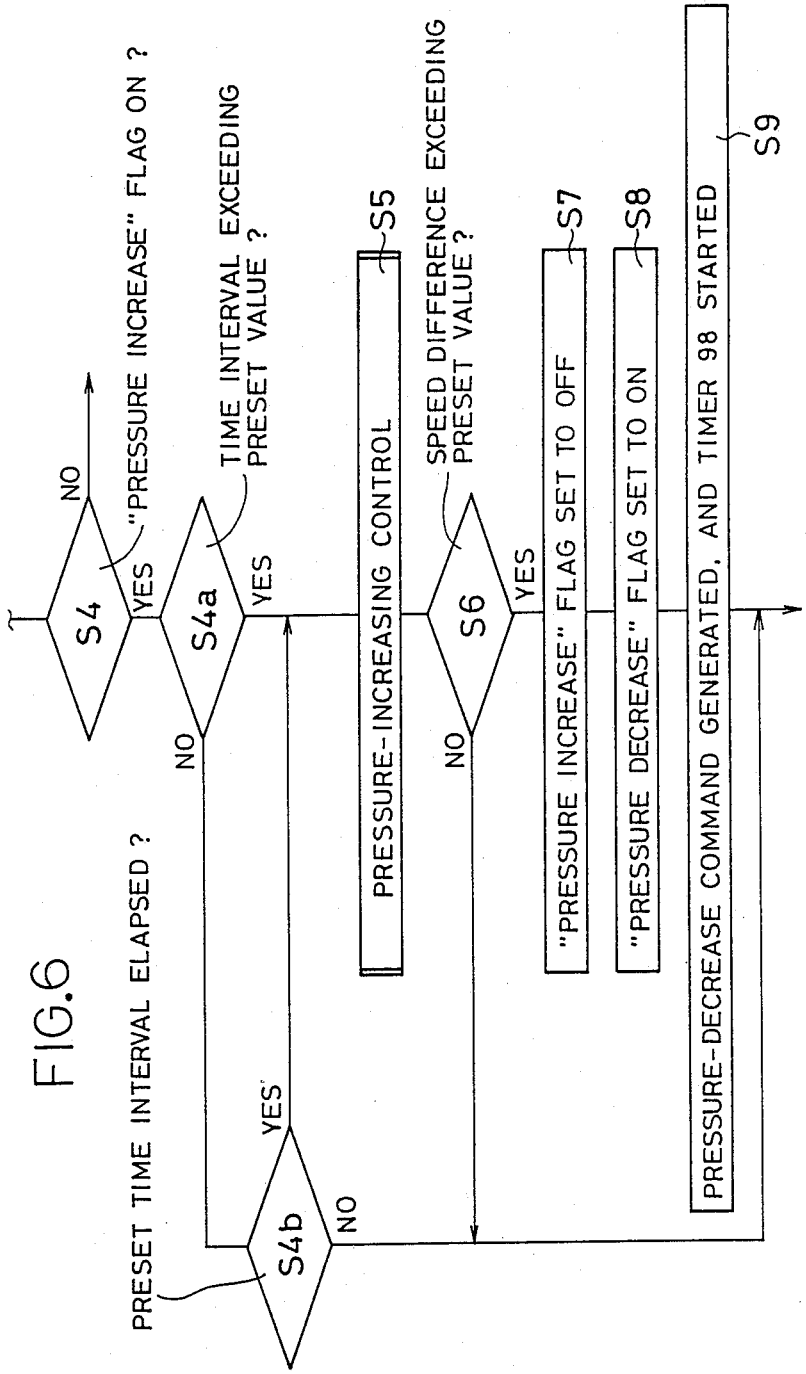

Referring to FIGS. 5 and 6, there is shown an example of a modified braking system which incorporates the above-indicated arrangement to provide a delay based on the time interval between the two successive pressure-increase actions, in addition to the arrangement to provide a delay at the second occurrence of the pressure-increase condition. In this modified braking system, step S23 of FIG. 3B is followed by step S23a of FIG. 5 in which the timer 98 is started to measure a time length after the PRESSURE INCREASE flag 106 is set to ON in step S23, i.e., a time interval after the commencement of the pressure increase in the following step S5. Step S23a is followed by step S10 of FIG. 3A. The time interval between this point of time and the commencement of the next pressure increase, that is, the time interval between the two successive occurrences of the pressure-increase condition is monitored by execution of steps S4a and S4b shown in FIG. 6. In step S4a following step S4, a determination is made as to whether the time length measured by the timer 98 exceeds the predetermined value. If an affirmative decision is obtained in step S4a, the same control flow goes to steps S5 and S6, and the brake pressure control operation is performed in the same manner as in the preceding embodiment. If a negative decision is obtained in step S4a, that is, if the measured time interval is shorter than the predetermined value, this indicates the occurrence of the control vibration, and therefore the control flow goes to step S4b to determine whether the predetermined delay time has passed or not. The steps S4b, S10, S11, S1–S4 and S4a are repeated until the predetermined delay time has elapsed. Thus, the present modified braking system is adapted to provide a delay if the time interval from one occurrence of the pressure-increase condition to another occurrence is shorter than the predetermined value.

Although the above modified embodiment is adapted to provide a delay based on the time interval between two successive occurrences of the pressure-increase condition, it is possible that the delay may be provided based on the time interval between two successive occurrences of the pressure-decrease condition. Further, the principle of the present invention may be practiced, with only the arrangement based on such a time interval, namely, without the arrangement to provide a delay at predetermined occurrences of the pressure-increase condition and/or pressure-decrease condition (as in the illustrated embodiments of FIGS. 3A and 3B, and FIGS. 5 and 6).

It will be obvious that the principle of the present invention is applicable to the traction control of the vehicle in which excessive amounts of slip of the drive wheels are prevented by activating the brakes for the drive wheels.

It will be understood that the present invention may be embodied with various other changes, modifications and improvement which may occur to those skilled in the art.

What is claimed is:

1. A braking system including a hydraulically operated brake for braking a drive wheel of a motor vehicle driven by a drive system, comprising:

slip-detecting means for detecting an amount of slip of said drive wheel and producing output signals indicative of the detected amounts of slip of the drive wheel;

pressure-regulating control means connected to said slip-detecting means, for increasing or decreasing a fluid pressure to be applied to said brake in response to each output signal whose value indicates a pressure-increase or pressure-decrease condition which requires an increase or decrease in said fluid pressure, respectively, whereby the amount of slip of said drive wheel is maintained within an optimum range; and delay means operative to reduce a tendency of resonance of the drive system by commanding said pressure-regulating control means to delay commencement of pressure-increasing control, upon the establishment of at least one of a plurality of occurrences of said pressure-increase condition and irrespective of the magnitude of said fluid pressure at a point of time at which the at least one pressure-increase condition is established, said delay to continue for a predetermined time duration from said point of time such that during said delay, no pressure-increasing control is effected, said pressure-regulating control means commencing the delayed pressure-increasing control to increase said fluid pressure, upon expiration of aid predetermined time duration.

2. A braking system according to claim 1, wherein said predetermined time duration is about a half of a period corresponding to a natural frequency of said drive system.

3. A braking system according to claim 1, wherein said delay means provides a delay if a time interval between a last one of the occurrences of said pressure-increase condition and a current one of said occurrences is less than a preset value.

4. A braking system according to claim 1, wherein said at least one occurrence of said pressure-increase condition includes at least one predetermined occurrence within a period of operation of said pressure-regulating control means which corresponds to an operation of said brake.

5. A braking system according to claim 4, wherein said delayed commencement of pressure-increasing control occurs only with respect to a first occurrence of the pressure-increase condition which follows a first occurrence of the pressure-decrease condition within said period of operation of said pressure-regulating control means.

6. A braking system according to claim 1, wherein said delay means commands said pressure-regulating means to delay the commencement of pressure-increasing control with respect to each of said plurality of occurrences of said pressure-increase condition.

7. A braking system including a hydraulically operated brake for braking a drive wheel of a motor vehicle driven by a drive system, comprising:

slip-detecting means for detecting an amount of slip of said drive wheel and producing output signals indicative of the detected amounts of slip of the drive wheel;

pressure-regulating control means connected to said slip-detecting means, for increasing or decreasing a fluid pressure to be applied to said brake in response to each output signal whose value indicates a pressure-increase or pressure-decrease condition which requires an increase or decrease in said fluid pressure, respectively, whereby the amount of slip of said drive wheel is maintained within an optimum range; and delay means for commanding said pressure-regulating control means to delay commencement of pressure-increasing control, with respect only to a first occurrences of said pressure-increase condition following a first occurrence of said pressure-decrease condition within a period of operation of said pressure-regulating control means which corresponds to an operation of said brake, for a predetermined time duration from the point of time at which said pressure-increasing condition is established.

8. A braking system according to claim 7, wherein said predetermined time duration is about a half of a period corresponding to a natural frequency of the drive system.

* * * * *